United States Patent [19]

Gallas

[11] Patent Number: 4,698,374

[45] Date of Patent: Oct. 6, 1987

[54] OPTICAL LENS SYSTEM INCORPORATING MELANIN AS AN ABSORBING PIGMENT FOR PROTECTION AGAINST ELECTROMAGNETIC RADIATION

[76] Inventor: James M. Gallas, 4934 Timberwind, San Antonio, Tex. 78250

[21] Appl. No.: 739,556

[22] Filed: May 30, 1985

Related U.S. Application Data

[63] Continuation-in-part of Ser. No. 618,745, Jun. 8, 1984, abandoned.

[51] Int. Cl.$^4$ .............................................. C08L 89/04
[52] U.S. Cl. ..................................... 523/106; 350/1.1; 350/1.2; 350/1.7; 528/205; 528/206; 528/392; 526/259; 526/314; 526/238.1; 428/412; 428/441; 527/202; 527/203; 548/469
[58] Field of Search .................. 350/1.1, 1.7; 528/205, 528/392, 206; 428/412, 441; 260/113; 526/314, 238, 259; 527/202, 203; 523/100

[56] References Cited

U.S. PATENT DOCUMENTS 3,322,719  5/1967  Peilstocker ........................... 350/1.1
4,464,525  8/1984  Vance ................................... 528/392

FOREIGN PATENT DOCUMENTS 9071149  10/1974  Japan .

*Primary Examiner*—Paul R. Michl
*Assistant Examiner*—Alex H. Walker

[57] ABSTRACT

The present invention is directed to optical lens systems for radiation protection of the human eye utilizing melanin as an absorbing pigment.

16 Claims, 3 Drawing Figures

OPTICAL LENS SYSTEM INCORPORATING MELANIN AS AN ABSORBING PIGMENT FOR PROTECTION AGAINST ELECTROMAGNETIC RADIATION

RELATED APPLICATION

This application is a continuation-in-part application of applicant's copending application Ser. No. 06/618,745, filed 06/08/84, now abandoned.

BACKGROUND OF THE INVENTION

I. Field of the Invention

This invention relates to the use of melanin as a pigment to provide ultraviolet, visible and near-infrared absorption, and more specifically, as it relates to protective eye wear.

II. Description of the Prior Art

In recent years increasing attention has been given to the importance of protecting the eyes and skin from radiation emitted by artificial and natural light sources. Prolonged exposure of the eyes to reflected solar ultraviolet radiation is believed to result, for example, in the formation of cataracts and general tissue damage.

A variety of commercial optical filters have evolved to meet the threats posed by these radiation environments. Such optical absorption systems include sunglasses, aircraft and automobile window, welders glasses and others.

In the case of sunglasses, two general types of materials are currently employed as practical absorbing components. Metallic films deposited onto plastic lens substrates are very effective sunscreens providing broad band attenuation of electromagnetic waves from the ultraviolet into the near infrared region of wavelengths. However two disadvantages are associated with this type of sunglass system. Manufacturing steps beyond the formation of the basic plastic lens are required and secondly, waves incident from the rear and reflected directly into the eye pose a new problem and require further manufacturing modifications.

Dyes and pigments comprise the second general class of optical absorbers. These molecular or polymeric elements are either deposited as thin films or are dispersed into the plastic matrix. U.S. Pat. No. 4,157,892 illustrates a method of coloring water-absorbable plastics. Disadvantages of this type of system are often the inability of the dye or pigment to absorb radiation sufficiently over all the ultraviolet wavelengths and a tendency to photodegrade. Photodegradation is particularly common to organic dyes and pigments.

Prior art does exist for melanin as a sunscreen; however, this prior art is restricted to the use of melanin as an ultraviolet protecting pigment in a cosmetic cream applied to the skin (see Japanese Patent No. 74 71,149).

The use of melanin, an easily synthesized biopolymer, as a sunglass pigment, offers several advantages over the prior art. These advantages will become evident in the following description.

For the purpose of the present description, melanins are defined and classified as in the book entitled *Melanins*, by R. A. Nicolaus, published in 1968 by Hermann, 115, Boulevard Saint-Germain, Paris, France which work in its entirety is incorporated herein by reference. As defined by Nicolaus, melanins constitute a class of pigments which are widespread in the animal and vegetable kingdoms. While the name melanin in Greek means black not all melanins as pigments are black but may vary from brown to yellow. The melanins may be classified as follows: Eumelanins are derived from the precursor tyrosine (1):

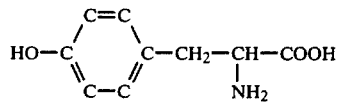
(1)

Phaeomelanins have as their precursors tyrosine and cystine (2):

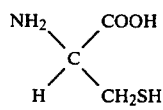
(2)

Allomelanins, allo meaning other, are formed from nitrogen-free precursors, primarily catechol and 1,8-dihydroxynaphthalene. (See The Merck Index, Tenth Edition, page 827, item 5629, Melanins) Quinones are the usual intermediates in allomelanin synthesis. The synthesis of melanins occurs in nature as well as being produced synthetically. An example of the synthetically produced catechol melanin and DOPA melanin are found in the article by Froncisz, W., Sarna, T., Hyde, James S. Arch. Biochem. Biophys. "Copper (2+) ion Probe of Metal-ion Binding Sites in Melanin Using Electron Paramagnetic Resonance Spectroscopy." I. Synthetic Melanins. (1980, 202(1), 289–303). The catechol melanin is disclosed in the Froncisz et al. article as being produced as follows:

Catechol Melanin. A solution of 15 g of catechol in 3 L of deionized water was brought to pH 8 with ammonium hydroxide, and then air was bubbled through the stirred solution for four days. The resulting melanin was precipitated by addition of concentrated hydrochloric acid to bring the pH to 2, then washed with dilute HCl and dialyzed against deionized water for several days to remove $H^+$ and $Cl^-$ ions. The concentration of the melanin suspension was estimated by drying an aliquot in vacuum over phosphorus pentoxide and weighing. Oxidized catechol melanin was prepared by adding 10 mL of $10^{-3}$M potassium ferricyanide to 30 mg of melanin and incubating for 10 minutes. The suspension was then spun down, washed twice with deionized water and suspended in 5 mL of deionized water.

SUMMARY OF THE INVENTION

The present invention is directed to optical lens systems for radiation protection utilizing melanin as an ultraviolet, visible and near-infrared absorbing pigment. The essential and distinguishing feature of the present invention is the specific use of melanin as the absorbing pigment in optical lenses or filters, for example, in sunglasses.

DETAILED DESCRIPTION

Figure 1:
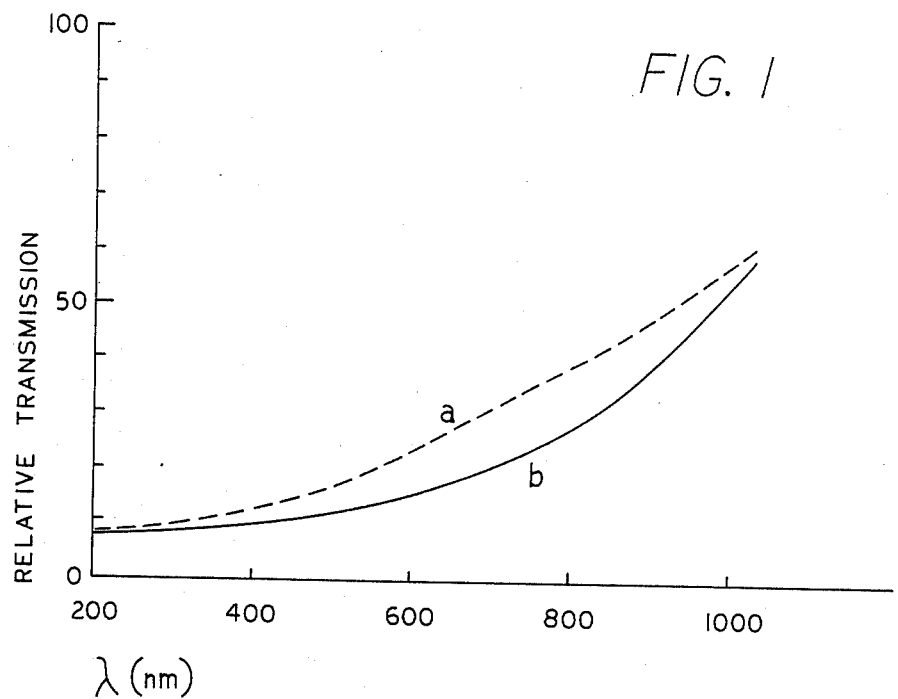
Figure 2:
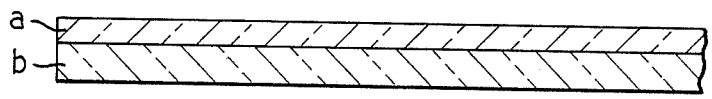
Figure 3:
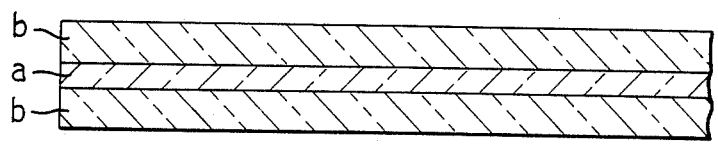

The following detailed description of the preferred embodiments of the present invention will be understood by reference to the accompanying drawings wherein:

FIG. 1 curve (a) is an optical transmission spectrum of a plastic lens containing melanin and is described further in Example 1. below;

FIG. 1 curve (b) is an optical transmission spectrum of melanin, or a melanin coating and is described further in Example 2. below;

FIG. 2 is a drawing illustrating a transparent plastic or glass lens substrate labeled "b" and a coating of melanin labeled "a" which covers said substrate "b"; and FIG. 3 is a drawing illustrating a coating or film of melanin "a" sandwiched between transparent plastic or glass lens substrates labeled "b".

As set forth in more detail in Nicolaus' book, *Melanins*, the synthetic or natural melanins are the free-radical polymerization products of the melanin precursors. An illustration of the synthetic or natural melanins is the oxidation of tyrosine to DOPA, followed by the free-radical polymerization of DOPA to melanin. The allomelanins may be formed by the free-radical polymerization of a nitrogen-free melanin precursor such as catechol. Whatever the melanin precursor, the polymerization results in the formation of a polymer, melanin, whose exact number of units of melanin precursor are not known. Because of the number of reactive sites in the melanin precursor and its intermediates, this polymerization is heterogeneous and the result is an amorphous, highly irregular, three dimensional polymer whose structure is poorly characterized. Therefore, a given melanin is characterized primarily by its precursor and the spectroscopic properties of the melanin rather than by an exact determination of the structure and chemical formula of the melanin. Hence, a melanin is characterized as follows:

1. a polymer of a monomeric melanin precursor
2. a polymer whose monomeric precursors polymerize via a free-radical mechanism
3. a polymer with a broad band optical absorption spectrum as shown in FIG. 1
4. a polymer with a stable free-radical which is often studied through ESR spectrocopy
5. an amorphous, three dimensional, heterogeneous polymer of varying molecular weight.

In the present invention the preferred melanin precursors are DOPA and dopamine which form the eumelanins and catechol which forms an allomelanin respectively. The formula for DOPA (3), dopamine (4) and catechol (5) are as follows:

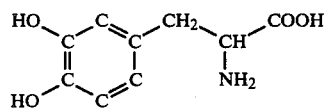

(3)

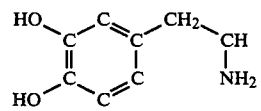

(4)

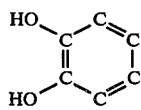

(5)

Other known melanin precursors which may be used in the present invention are 5,6-dihydroxyindole; leucodopachrome; tryptamine; serotonin; 5,6-dihydroxyindole-2-carboxylic acid; epinephrine; norepinephrine; tyrosine, adrenochrome; and 1,8-di-hydroxynapthalene.

Heretofore, in preparing synthetic melanins oxygen has been used to initiate the free-radical polymerization in a base and water solution. However, applicant has found that it is possible to initiate this reaction using a free-radical initiator and to use other solvents. A preferred free-radical initiator is benzoyl peroxide. Other free-radical initiators are di-tert-butyl peroxide and di(1-cyano-1-methyl ethyl)diazene(azobisisobutyronitrile). The choice of the free-radical initiator is determined by its solubility properties and the desired reaction kinetics. Other initiator systems besides peroxides and azo compounds include redox pairs, photochemical systems, perborates, percarbonates and radiation. The typical solvent for preparing the synthetic melanins is water, however, applicant has found that organic solvents such as dimethyl sulfoxide (DMSO), chloroform, toluene and 1,2-dichloroethane may also be used.

The melanins of the present invention are all the polymerization reaction products of the melanin precursors used, which as polymerization reaction products are amorphous, highly irregular polymers. These polymers may have a number of varying structures according to the present invention; however, the polymer or mixture thereof is characterized as having the broadband optical absorption spectrum as shown in FIG. 1. This characteristic of the melanins as utilized in the present invention is very important in that the absorption characteristics are very similar to the action spectrum for retinal damage. In fact, an essential feature of the present invention is that the absorption spectrum associated with melanin is very similar to the action spectrum for retinal damage. It is known that although the cornea and lens absorb most of the ultraviolet rays from the sun, there is still a range of wavelengths between 400 nm and 550 nm which reach the retina and cause photochemical damage. This damage increases exponentially as the wavelength is decreased toward 400 nm and it has been shown that this action spectrum is very similar to the absorption spectrum of melanin. Relatively few of the sunglass manufacturers have managed to produce lenses which filter out ultraviolet radiation and, of those, most cut out the ultraviolet wavelengths abruptly, while allowing the region between 400 nm and 550 nm to be transparent. Therefore an optical lens comprising melanin which is placed in front of the eye would not only filter out radiation damaging to the retina, but it would also filter out the wavelengths in the proper proportions. Of course such a lens would also offer radiation protection to the cornea and lens of the eye.

The present invention is more specifically shown by the following examples:

A first method according to the present invention in which the melanin pigment may be incorporated into a lens system is to polymerize the melanin precursor simultaneously with a monomer which is polymerized by free-radical polymerization. In this embodiment the melanin pigment is uniformly dispersed within the plastic layer or lens. For ease of incorporating the melanin precursor it is preferred to use a liquid monomer to form the lens system and such monomers are diethylene glycol bis(allyl-carbonate) [CR-39, a trademark product of PPG], styrene, and methylmethacrylate. These liquid monomers polymerize by free-radical polymerization and yield a polymer which is a clear, transparent plastic suitable for an optical lens when polymerized in the absence of other materials or in other words in the presence of the monomer per se.

In the simultaneous polymerization of both the liquid monomer and the melanin precursors of the present invention, a preferred method is to add the melanin precursor to the liquid monomer while providing good mixing. To this mixture is added the free-radical initiator. The mixture is maintained at a temperature between 50° and 60° C. until the solid polymers are formed. In general, the greater the concentration of melanin precursor the greater the concentration of free-radical initiator is required for the simultaneous polymerization. Applicant has found that (using 10 ml of CR-39 and 55° to 60° C. as a standard), if the ratio of free-radical initiator to melanin precursor is maintained at about 10:1 by weight that simultaneous polymerization occurs.

Example 1

A melanin-plastic using the melanin precursor catechol may be prepared as follows: Dissolve 400 mg of benzoyl peroxide into 10 ml of diethylene glycol bis(allyl carbonate) [CR-39] at 50 degrees celsius, stirring continuously until the benzoyl peroxide is fully dissolved. Then add 30 mg of catechol and heat for one day; heat an additional two days at 65 degrees celsius, keeping the sample under a nitrogen atmosphere during the heating. The result is a transparent solid lens with an amber color. The solid is then cured in a vacuum oven at 110 degrees celsius for two hours. The relative transmission for the amber colored solid, of thickness 40 mm, is shown in FIG. 1 curve (a). This transmission spectrum illustrates the essential feature of melanin incorporated into an optical lens system for the purpose of radiation protection: that is, a uniform reduction in transmittance across the ultraviolet, visible and near infrared wavelengths, with greatest reduction in transmission occurring at the shorter wavelengths where the radiation is most damaging to biological molecules and tissue. An additional feature of this product is its photostability. Samples prepared as described in Example 1 were placed in direct sunlight and open to the atmosphere continuously for a period of 10 weeks during which the daily average solar intensity peaked midday at approximately 850 watts per square meter. There was no discernible discoloration. This feature is quite uncommon for the case of organic pigments. Finally an important advantage of this pigment lens system is that it requires negligibly more effort than the manufacture of the lens without the pigment.

Example 2

35 mg of dopamine and 40 micro-liters of triethylamine is added to 10 ml of diethylene glycol bis(allyl carbonate) [CR-39] at 55 degrees centigrade and stirred for approximately one hour (this represents a saturated solution); 350 mg of benzoyl peroxide is then dissolved and the system is heated at 65 degrees celsius for approximately 30 hours until a solid amber colored plastic is formed. The product is then cured at approximately 100 degrees celsius for one hour in a vacuum oven. The optical absorption spectrum is similar to that of melanin (formed in the standard manner).

In another method of the present invention, the melanin is applied to the surface of the lens as a coating. This configuration is illustrated in FIG. 2. The layer labeled "a" is meant to be the melanin coating and the layer labeled "b" is meant to be the lens substrate. The configuration may be achieved by first preparing a melanin solution as described earlier. Drops of the melanin are then placed onto a clean transparent lens surface and the solvent is then allowed to evaporate, leaving behind a uniform melanin film. The melanin is prepared by any of the usual methods for melanin preparation. In these methods the typical solvent is water, however, it has been found that organic solvents such as dimethyl sulofixde (DMSO), chloroform, toluene and 1,2-dichloroethane may also be used.

Example 3

A melanin coated-glass lens system using the melanin precursor DOPA is prepared as follows: 1 gram of DOPA is dissolved into 200 ml of water. 50 ml of potassium phosphate (0.025M) and sodium phosphate (0.025M) buffer solution is then added and the pH is then adjusted to 7.5. Air is then bubbled into the stirred solution for three days. The black suspension is then extensively dialyzed and the concentration of the melanin is increased by allowing the water to evaporate by a factor of 0.1 of the original volume. A glass lens substrate is then made hydrophilic by treating it with a hot solution of chromic acid, followed by a rinse with deionized water. Several drops of the concentrated melanin suspension are then allowed to spread over the glass surface. The system is allowed to slowly dry, leaving a solid, transparent melanin film. The optical density of this film is shown in FIG. 1 curve (b) and is similar to that of FIG. 1 curve (a).

In the preferred embodiment a melanin film is formed by first dissolving a melanin precursor in an organic solvent or in water; a free-radical initiator is then added and heat is added to synthesize the melanin. This intermediate product is a melanin solution or suspension. The suspension is then mixed with a transparent polymer or plastic which serves as a binder or as a binder/adhesive. The solvent is then evaporated having served as means of dispersing melanin in the binder/adhesive. A suitable binder/adhesive is the common epoxy resin and a melanin may be dispersed in the epoxy resin as described. Thereafter, the hardener is then combined with the epoxy/melanin liquid to form a uniform liquid mixture which is then immediately sandwiched between two parallel transparent lenses thereby forming a melanin/epoxy resin mixture as illustrated in FIG. 3. By this method a melanin film is produced which also acts as an adhesive to join the parallel lenses.

Example 4

500 mg of dopamine and 0.12 ml of triethylamine is added to 10 ml of chloroform to form a saturated solution; approximately 250 mg of benzoyl peroxide is added to the system; the system is then allowed to react at room temperature for 24 hours to form a concentrated melanin solution. The solution is then filtered and mixed with about 2 ml epoxy resin. The chloroform is then removed from the product by evaporation leaving melanin dispersed in epoxy resin. Epoxy catalyst, or hardener is added and the system is slowly stirred to produce an even color and drops of the product are deposited onto either glass or plastic lenses; an identical glass or plastic lens is placed over the melanin colored epoxy drops. In this way the epoxy serves to bind the melanin and adhere together the plastic or glass lenses.

From the foregoing description, the principal advantages of melanin as an absorbing pigment in an optical lens for radiation protection are:
 a. melanin is resistant to light, thermal and chemical degradation;
 b. melanin provides broad band optical absorption; this covers the entire solar spectrum (See FIG. 1);

c. the melanin absorptivity increases steadily for the shorter (more damaging) wavelengths (See FIG. 1);

d. the increase in the melanin absorptivity for the shorter wavelengths is an optimum for protection of the retina against radiation damage; that is, the shape of the melanin absorption spectrum is similar to the shape of the retina damage spectrum;

e. because of its structure, melanin is able to effectively stabilize and accomodate free-radicals; such free-radicals can be induced by heat or light in molecules nearby the melanin macromolecule and can then transfer to the melanin structure for stabilization; without such an avenue the highly reactive free-radicals would react and lead to chemical degradation; and f. melanin is photochromic; that is light can induce immediate darkening of melanin; this darkening may represent a reversible oxidation of the polymer with free radical intermediates.

While the invention has been described herein with reference to certain specific materials, procedures and examples, it is understood that the invention is not restricted to the particular materials, combinations of materials and procedures selected for the purpose of illustrations. Numerous variations of such details can be employed by those skilled in the art within the scope of this invention which is defined by the appended claims.

What is claimed is:

1. An optical lens system for protecting the eye from ultraviolet, visible and near-infrared radiation, comprising:
   a substrate; and
   melanin;
   said substrate and said melanin forming a solid, clear and transparent lens.

2. A system according to claim 1 wherein said substrate is a polymer formed by free-radical polymerization and the melanin is formed simultaneously with said polymer.

3. A system according to claim 2 wherein the melanin is formed from a melanin precursor selected from the group consisting of catechol, dopamine and DOPA.

4. A product for providing radiation protection, comprising:
   an optical lens; and
   a thin layer of melanin adhered to said lens;
   said layer of melanin being clear and transparent.

5. A product according to claim 4 wherein the melanin is formed from a melanin precursor selected from the group consisting of catechol, dopamine and DOPA.

6. A product according to claim 4 wherein said optical lens is a single substrate.

7. A product according to claim 4 wherein said lens includes a first lens layer and a second lens layer.

8. A product according to claim 7 wherein said layer of melanin is between said first and second lens layers.

9. A product according to claim 8 wherein said layer of melanin contains a binder/adhesive.

10. A product according to claim 9 wherein said binder/adhesive is a common epoxy resin.

11. A product for providing radiation protection, comprising:
    a solid, transparent substrate; and
    a solid, transparent melanin as an ultraviolet, visible and near-infrared radiation absorbing pigment.

12. A product for providing radiation protection from ultraviolet, visible and near-infrared radiation, comprising:
    a solid, transparent substrate; and
    a melanin being in a non-aggregated state.

13. A product according to claim 12 wherein said substrate is an optical lens.

14. A product according to claim 12 wherein said melanin is uniformly dispersed in said substrate.

15. A product according to claim 12 wherein said melanin is a layer of melanin adhered to said substrate.

16. A product according to claim 15 wherein said layer of melanin is between a first layer of substrate and a second layer of substrate.

* * * * *